Jan. 13, 1942.  W. L. CLEMMER  2,269,437
METHOD AND MEANS FOR DETERMINING VERTICAL ANGLES OF ENERGY WAVES
Filed May 26, 1937
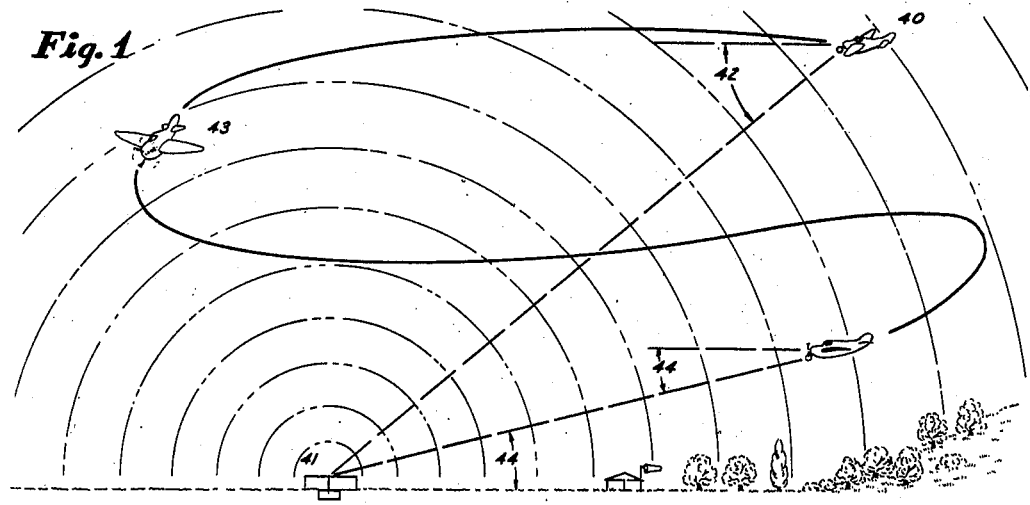
Fig. 1
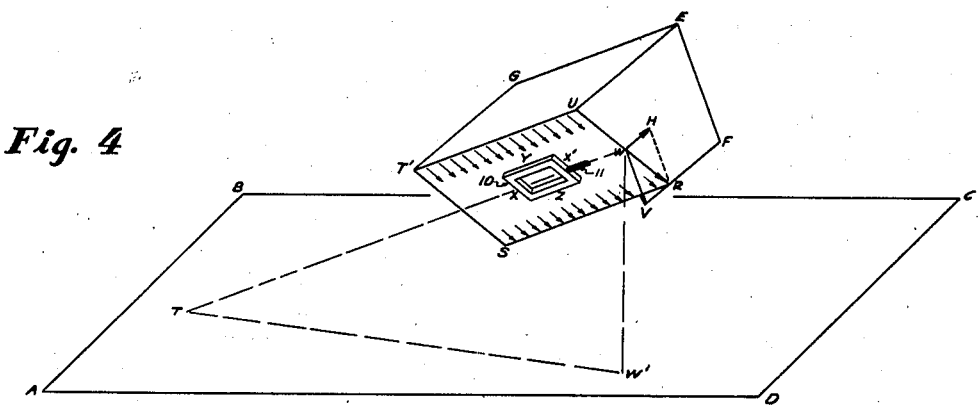
Fig. 4
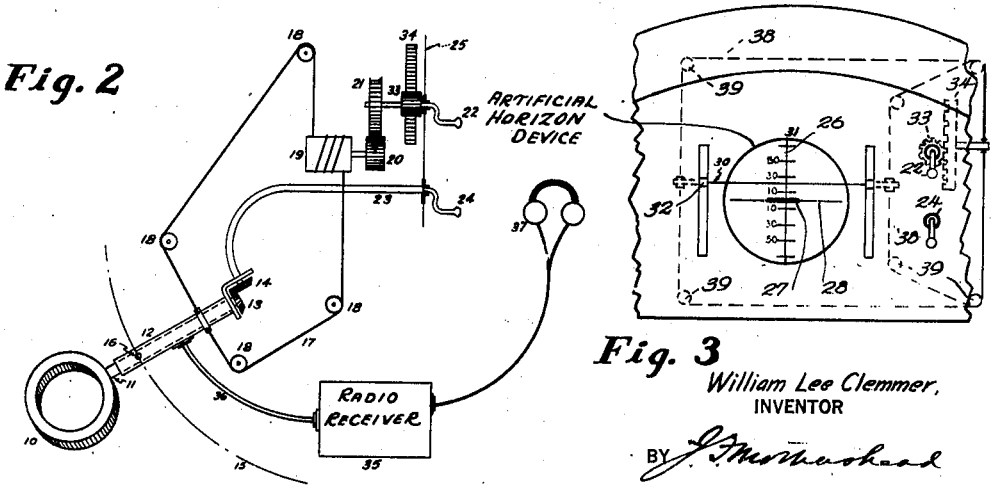
Fig. 2
Fig. 3
William Lee Clemmer,
INVENTOR
BY
ATTORNEY Patented Jan. 13, 1942

2,269,437

UNITED STATES PATENT OFFICE 2,269,437

METHOD AND MEANS FOR DETERMINING VERTICAL ANGLES OF ENERGY WAVES

William Lee Clemmer, Monroe, Wis.

Application May 26, 1937, Serial No. 144,871

15 Claims. (Cl. 177—352)

(Granted under the act of March 3, 1883, as amended April 30, 1928; 379 O. G. 757)

This invention aims to provide an improved method and means for determining vertical angles of energy waves.

In the illustrative embodiment herein disclosed the method and means involves the use of the directional loop antenna in a novel manner in the induction field of a transmitting antenna so as to measure angles in the vertical plane by the simultaneous balancing of minimum signals obtained in three dimensions.

In measuring vertical angles, or the angle of inclination, of an approaching wave front, it is possible to incline the loop in such position that a minimum, or maximum, signal is obtained. Such minimum, or maximum, signal is obtainable by inclining the loop in the radiation field of a transmitting antenna in the vertical plane and determining the angle of inclination of the wave front by measuring the angle of inclination of the loop. Maximum and minimum signals may also be obtained in each of the three planes. In making the present invention it has been discovered that if the minimum signals, one from each plane, are simultaneously balanced together a pure "null," free of residual signal, may be produced and the angle of inclination of the wave front may be measured with a great degree of accuracy. Such measurements in the preferred embodiments of the invention are made in the induction field (cf. "Principles of Radio Communication," 2nd edition, by Morecroft, pages 816–821) of a transmitting antenna.

An example of the use of this principle in blind landing of aircraft may be generally described as follows: A receiving loop antenna is mounted in the fore underpart of an aircraft, preferably on the fore and aft center line, so that its movement in the vertical plane as well as its rotation about its axis of mount are controlled from the cockpit of the aircraft. By the preferred mounting the movement of the antenna in a horizontal plane follows the movement of the aircraft. The aircraft is flown into the induction field of the transmitting antenna on the landing field in the usual manner using a homing loop, by dead reckoning, or any standard method, the aircraft being kept at a safe altitude of say 6,000 feet. The pilot knows that if he can descend to the field at a certain angle, he will clear all obstructions around the field. On entering the induction field he begins manipulating the vertical angle loop and reading the vertical angle, which, in accordance with this invention, may be read directly from the face of the artificial horizon as hereinafter described. He may be assisted in such measurements by the co-pilot. He thus establishes himself on a vertically diagonal line of position which he will follow in descent as long as he keeps the aircraft in a position such that the vertical angle measured (preferably on the face of the artificial horizon) remains equal to the desired angle of descent. He will locate the field in a horizontal plane as he does in the usual standard practice, for example, by means of a separate homing loop. The antenna on the landing field is preferably of light construction such that it will not damage the aircraft should the aircraft run into this antenna.

The use of the loop in obtaining bearings has, in the past, been confined to the radiation field in which the field's two components, electrical and magnetic, are in phase. In such practice the effect of the induction field is "balanced out" as much as possible. By using the induction field, in accordance with the preferred embodiments of this invention, i. e., the field in the vicinity of the transmitting antenna, in which the two components are out of phase, a pure "null," or minimum signal, free of residual, is obtainable by combining three minima (which may be termed component-nulls), one from each of the three dimensions. It is well known that the accuracy of the line of bearing derived from a loop depends upon strength of signal received. The induction field and the radiation field are of equal strength at $$\frac{\lambda}{2\pi}$$

from the transmitting antenna, and the strength of the induction field decreases with the square of the distance from the transmitting antenna. Consequently the strength of the induction field a few miles away from the transmitting antenna is negligible. From these facts it is evident that an antenna system which has poor radiation qualities but which develops a good induction field will be free from interference of nearby transmitters. Further, that the accuracy of the line of bearing increases as the square of the distance to the transmitting antenna, compared with an increase in accuracy which varies only directly as the distance when the radiation field is used. In using low frequencies a greater proportion of the energy is delivered to the induction field than to the radiation field, so that low power equipment may be used in practicing this invention tending toward economy. For example, accuracy to within 10 minutes of angular measurement of angles as small as eight degrees has been obtained by test at a distance of one-half mile from the transmitter transmitting on 375 kcs. with a 6-watt output.

It may be readily seen that sufficiently accurate measurements of angles in the vertical plane may be obtained by this method to produce vertically diagonal lines of position for an aircraft. And since the measurement of angles becomes more accurate as the distance to the transmitter is reduced, the method is particularly adapted to the blind landing of aircraft.

The further practical value of the method and means of this invention is manifest when emphasis is placed upon the general reliability of the shape of the induction field as well as the fact that low frequencies are practically free of freakish reflections and distractions.

In the accompanying drawing of an illustrative embodiment of the invention,

Fig. 1 is a diagram indicating the manner of landing an aircraft in accordance with one embodiment of the invention, Fig. 2 is diagrammatic representation of one mode of arranging the loop antenna, Fig. 3 is a diagrammatic representation of one mode of arranging the instrument panel devices which are preferably employed; and Fig. 4 is a theoretical diagram believed to afford a simple hypothesis for the proved operability of the system.

Referring to the illustrative embodiment of the invention shown in Figs. 1 to 3, the loop antenna 10 may be either of the shielded or of the unshielded type, and may be of any size that will deliver sufficient pick-up. A standard shielded type antenna measuring about fifteen inches in diameter has been used with satisfactory results.

This antenna, in accordance with the invention, is mounted so that the loop may be oriented simultaneously in three dimensions, suitable indicating means being provided to follow and indicate the position of the loop. In the form shown the loop 10 is carried on an arm 11 rotatable in a sleeve 12 by means of bevel gearing 13, 14. The sleeve 12 in the form shown is projected through the fuselage of the aircraft, indicated by the broken lines 15, and is tiltable in the vertical plane on trunnions 16. Thus the trunnion mounting provides means for tilting the loop in one plane; namely, the vertical plane, and the rotatable mounting of the arm 11 in the sleeve 12 provides for tilting it in a second plane at right angles to the first. Means to orient the loop in the horizontal plane is also provided, herein by mounting the loop with its axis held on the fore and aft line of the aircraft so that turning of the aircraft in the horizontal plane will automatically effect this orientation.

The tilting of the sleeve 12 on its trunnions 16 may be accomplished by suitable means, such as the cable 17 connected to the sleeve 12 and trained over pulleys 18 and drum 19, drum 19 being rotated in the illustrated arrangement, by gearing 20—21 operated by crank-handle 22 which is preferably mounted on the instrument panel 25 (see Fig. 3).

Similarly, the rotation of the arm 11 in the sleeve 12 may be suitably effected, as by the gearing 13, 14 driven by a flexible shaft drive 23 operated by crank-handle 24 which is also preferably mounted on the instrument panel 25, as shown in Fig. 3.

By this arrangement it will be apparent that a method and means is provided and contemplated generally for simultaneously orienting the loop in three dimensions, as truly as though it were mounted in gimbals permitting such orientation.

The means for indicating the position of the loop antenna, with reference to a plane parallel to the surface of the earth, in the form shown, comprises an indicator wire 30 moving over the face of the artificial horizon 31. The indicator wire 30 in the form shown is mounted between two movable parts 32 traveling vertically in a track fastened to the instrument panel. The movable parts 32 are geared to the control 22 regulating the movement of the loop in the vertical plane, such gearing being of any desired form, and being illustrated as comprising cords or cables 38 (Fig. 3) anchored to the movable blocks 32, trained over guide-pulleys 39 and anchored to the driven rack-gear 34 (see also Fig. 2) which meshes with the driving pinion 33.

By taking the gear drive 33—34 for the indicator from the shaft of crank 22, the gearing interposed between that shaft and the sleeve 12 supplies a reduction of movement between the travel of the loop 10 and movement of the indicating means 30.

As various artificial horizon devices are known to the art it is not deemed necessary to describe such a device in detail herein, although it may be noted that the form of device shown for purposes of illustration in Fig. 3 may comprise a glass face upon which is carried the usual vertical scale 26 crossed at its center by the usual character 27 representing the aircraft, and having behind the glass the usual gyro-supported vertical-graduated scale bearing the artificial horizon 28 at its zero point as shown. This type of instrument is well known, and its scale and horizon line 28 (really indicating the true horizontal plane at the altitude of the aircraft) stand in true position at all times, the glass face moving with the airplane. Thus as the airplane noses downward, for example, the entire scale and horizon 28 will appear as though moved upwardly behind the vertical line 26 and character 27. As the slope indicator 30 is moved relative to the airplane when the antenna 10 is tilted up and down relative to the airplane, it will be appreciated that by reading the positions of indicator 30 on the scale having the artificial horizon line 28 at zero, the vertical angle with reference to the true horizontal plane may be determined, and the airplane be guided downwardly to maintain the proper vertical angle of landing.

It will also be appreciated that just as the mounting of the vertical line 26 on the glass causes it to tip with reference to the graduated scale when the craft assumes a banked attitude, thus compensating for the attitude of the aircraft in determining the angle of reference to the artificial horizon, so this same factor compensates for the attitude of the craft in determining the vertical angle shown by indicator 30, this angle being read on the graduated scale at the point of crossing of the lines 30 and 26.

In other words, assume that the starboard wing of the plane is raised to an elevation above the port wing. Lines 26, 27 and 30 now are tipped counter-clockwise with reference to the scale having its zero line at 28. Thus line 26 will cross the scale lines diagonally instead of at right angles, and the length of the sections of line 26 between successive scale lines will be correspondingly increased compensating for the attitude of the aircraft.

In employing the arrangement shown to effect a landing in accordance with the invention, the aircraft 40 (Fig. 1) heads toward the transmitter 41 by use of its regular homing loop (not shown) which is entirely independent of the vertical angle loop 10. The resulting orientation of the aircraft effects orientation of the vertical angle loop in a horizontal plane, to obtain a minima (or component-null) in that plane.

In other words, as shown in Fig. 4, by heading the airplane parallel to and above line W'T toward transmitter T by means of its homing loop, the axis 11 of antenna 10 is positioned in plane TWW'.

Now let it be assumed that the aircraft is approaching the landing field on an airway radio beam which would take it across the field horizontally and that the aircraft is at an altitude greater than 3000 feet and not less than 20 miles from the field. The co-pilot, wearing headphones 37, Fig. 2, now tunes the loop receiver 35 to the frequency of the landing antenna 41, Fig. 1, and searches for this signal. For this searching operation he turns crank 24, Fig. 2, until he is certain the loop is not in a minimum position, i. e., not in plane T'URS (Fig. 4). If no signal is heard because the aircraft has not entered the receptive range of the transmitter 41, he repeats the searching operation as he approaches the transmitter until the identifying signal of the transmitting antenna is heard, at which time he takes a vertical angle reading by manipulating the loop with cranks 22 and 24 to obtain second and third component nulls.

The second minima (or component-null) is obtained by moving the loop 10 vertically by means of crank 22, gearing 21, 20, drum 19 and cable 17; and the third minima (or component-null) is obtained by revolving the loop 10 by means of crank 24.

The component-nulls obtained by the cranks 22 and 24 are balanced with the component-nulls obtained by the path of flight of the aircraft, producing a pure null with regard to the signal received by loop 10, at various angles of departure of the plane of the loop from parallelism with the axis 16 about which it is swung, which angle of departure is 0° when the axis 11 is normal to the direction of propagation of the field, increases to a maximum when the axis 11 is aligned with the direction of propagation of the field, and decreases again as the axis 11 passes such alignment and again approaches a position normal to the direction of propagation of the field. The axis 11 thus indicates the direction of approach of the field when the maximum deviation occurs to obtain a null, at which time the angle 44 of inclination of the loop to the horizontal may be read by means of the indicator 30 from the face of the artificial horizon.

An indication of the resultant signal received by the loop antenna 10, and of the reduction of this resultant signal to a null, is obtained by signal receiving means 35 of any form adapted to give indications responsive to the energy picked up by the loop antenna 10, operatively connected to receive input from antenna 10 through cable 36, and with its output suitably connected to signal and null indicating means, herein shown as the earphones 37, by way of example.

When the co-pilot has first obtained the signal on loop 10 and reduced it to a pure null, i. e., to a null with maximum angular rotations of the loop frame, as above mentioned the indicator 30 will cross the vertical scale line of the artificial horizon device 31 at a point virtually corresponding with the intersection of the artificial horizon therewith, thus showing a vertical angle reading of virtually zero.

The co-pilot then continues taking readings as the aircraft approaches the field and notifies the pilot when a desirable glide-angle reading of say 20 degrees difference between the artificial horizon line and the slope indicator 30 is obtained. In taking readings the co-pilot keeps the loop on the null position for maximum loop-plane deviation and in so doing is continually keeping crank 24 turning toward and from the maximum deviation position and turning crank 22 to right and left hitting both sides of the null which causes the indicator 30 to move up and down. As the aircraft approaches the field the null will become more clearly defined and the oscillations of indicator 30 will be smaller.

The steps in blind landing by this system are illustrated in Fig. 1. The aircraft 40 having come within close range of the field by using the conventional homing loop, the pilot reads the vertical angle 42 as above described and if in the position 40, finds his position to be at too sharp an angle for descent. He then passes over the transmitter as at 43 and circles around to the right, then again heading toward the transmitter, and thus taking vertical angle readings until the indicator 30 shows the vertical angle 44 at which he desires to approach the field. In Fig. 3, by way of example, the indicator 30 shows a vertical angle reading of approximately 20°. This angle 44 is such that a course of descent will clear all obstructions around the field. When this vertical angle 44 is reached the pilot continues reading the vertical angle and keeping the aircraft in such position that the indicated angle is equal to or slightly greater than the desired angle 44. By descending along this line he will ultimately come to a landing at or near the center of the field, depending on the accuracy of the receiver and instrument.

Fig. 4 illustrates in simplified form a theoretical explanation of the operation of the system which it is believed will facilitate an understanding of it. In this diagram the plane ABCD represents the surface of the earth, which over the small distance involved may be considered substantially plane. The line TW' indicates the apparent direction of propagation of the energy wave reaching the point W. The plane UEFV is a plane normal to the line TW and thus the plane of the lines of magnetic flux of the signals.

The magnetic flux at the given point W in the induction field may be considered as made up of components vertical in the plane UEFV and horizontal in that plane, such components being indicated by the vectors WV and WH in that plane. Thus the vector WR in plane UEFV is the resultant of magnetic flux at the point W and gives the direction thereof. This line WR with the line WT determines the plane RST¹U of magnetic flux, which for aid of perspective, is shown in Fig. 4 as the inclined face of an otherwise rectangular prism RG outlined in space.

For theoretical consideration it is simpler to consider the loop antenna 10 as of rectangular form comprising the end legs X, X¹, and the side legs Y and Z, this antenna 10 being carried by the arm 11 at the point W.

Now from the theory of the ordinary direction finding loop, in which the loop is rotated about a vertical axis and receives a maximum when its plane is directed edge-on toward the transmitter, and a minimum when directed face-on toward the transmitter or with its plane parallel to the magnetic flux lines; it will be clear that if the axis 11 (Fig. 4) is swung upwardly about the axis WH (i. e. swung upwardly in plane TWW') and into plane UEFR, then the plane of loop 10 will have to be positioned flatwise in the plane UEFR to obtain a null. Similarly, of course, when the loop 10 has its axis 11 swung downwardly about WH or an equivalent axis to a position in plane UEFR, the plane of the loop will have to face the transmitter T for a null; or lie edge-on toward T, so that the lines of magnetic force will thread through it, to obtain a maximum for this orientation of axis 11. Now, if the loop axis 11 were swung from the vertically upwardly directed position in plane UEFR to the downwardly directed position therein, without rotating the loop about the axis 11, the loop legs X, X', (that is, the plane of the loop), would at all times be parallel to the axis WH. However, if the loop-plane, i. e. X, X', were kept in such parallelism, clearly a null would not be obtained with axis 11 in the position shown in Fig. 4, and to obtain a null in such position, the plane of the loop (i. e. the plane of legs X, X') must be rotated to a greater and greater inclination with respect to axis WH, as the loop axis 11 is swung in plane TWW' from either of its positions of alignment with planes UEFR toward the position shown in Fig. 4, where the maximum deviation of the loop-plane from parallelism with WH occurs.

Thus if the arm 11 and axis of the loop 10 corresponding to it are maintained in the plane WTW¹, as by mounting the arm 11 to swing vertically in the longitudinal plane of the aircraft and heading the aircraft toward the apparent source T of the signal, as hereinbefore described, then by swinging the arm 11 vertically in the plane WTW¹, the axis 11 may be brought into alignment with the line WT in the plane RST¹U. By having rotated the loop about the axis 11, during such swinging of 11, until the point of reversal of rotation of the loop to obtain the null has been reached, the side legs Y and Z will have been brought into the plane RST¹U, and as the plane of the loop will now lie in the plane of magnetic flux RST¹U, no resultant lines of flux will link through the loop, and a pure null will be obtained. If the components WH and WV be considered instead of the resultant WR, then in this position these components may be considered as threading through the loop in opposite directions and each with equal effect, tending to generate equal and opposite E. M. F.'s in the loop, with the result of no flow of current therein and the obtaining of a pure null.

This null with maximum rotation of the loop plane from parallelism with WH (evidenced by the necessity to reverse the turning of crank 24 to obtain a null with further swing of axis 11) having shown that the axis 11 is in the plane RST¹U as well as the plane WTW¹, determines that the axis 11 has been properly brought into line with the line WT, and that its angle to the horizontal is the angle of incidence of the wave received at the loop. Obviously, if it is desired to refer to the vertical azimuthal plane TWW' as a reference for the rotation of the loop-plane rather than the axis WH, it is clear that when the loop lies in plane UEFR, the loop plane is perpendicular to plane TWW' and when the loop lies in the position shown in Fig. 4, the loop plane lies at a minimum acute angle with the plane TWW' corresponding to the acute angle made therewith by the resultant WR of the horizontal and vertical components of magnetic flux WH and WV, viz. the angle VWR.

From the foregoing it will also be apparent that while null operation is preferred, operation on the maxima may be practiced. In this instance, consider axis 11 as directed upwardly from W, in the intersection of planes TWW' and UEFR, then for maximum response in this position of axis 11 the loop will face edge-on toward T, that is, the plane of the loop will coincide with plane TWW'. Now because the resultant magnetic field WR is at an acute angle to TWW', as the loop axis 11 is swung to plane TWW' away from the intersection of planes TWW' and UEFR the loop will have to be rotated to maintain the maximum reception, and when the axis 11 coincides with line TW, will lie at the maximum angle with plane TWW' (i. e. at the angle VWR+90° or rotated 90° from the position shown in Fig. 4). When the axis 11 swings in plane TWW' past the line TW, the angle between the plane of the loop and the plane TWW' for maximum signal will again begin to decrease, the point of reversal from increasing angle to decreasing angle for maximum signal indicating the alignment of 11 with TW just as the reversal from decreasing angle to increasing angle indicated such alignment when working on the null position.

It will be apparent to those skilled in the art from the foregoing discussion that while the reversal of rotation of the loop-plane for a null with the antenna pointed toward the transmitter is preferred, in manipulating a loop antenna in accordance with the invention a similar reversal will occur, whether working on nulls or maxima for the TWW' plane, when the loop is in a position 180° removed from that shown in Fig. 4, i. e. pointing away from the transmitter, and that while no reversal of turning motion for for a null or maxima occurs when axis 11 swings through plane UEFR, only when it swings through such plane is the loop-plane oriented perpendicular to plane TWW' for a null, or coincident with plane TWW' for a maximum, in which orientation the axis normal to the plane of the loop, and the planar axis of the loop normal to axis 11, will indicate the direction to the transmitter T, respectively, as represented by the angle of approach of the wave front UEFR along the line from T, which angle, in the induction field, corresponds closely to the vertical angle of direction.

When the operation is regarded from the viewpoint of the combining of three component nulls, it will be seen that these components may be regarded as nulls for the plane UEFR, the plane TWW' and the plane T'URS.

From the foregoing detailed description it will be seen that the invention broadly resides in the novel method of and in means for positioning an antenna in an energy plane such as plane T'URS, with an axis of the antenna aligned with the intersection therewith of a directional plane such as TWW', and in the novel method of and means for measuring the absolute angle of the axis of such antenna or similar oriented axis, severally or in combination, and thus is not limited to the particular embodiments described.

The invention described herein may be manufactured and used by or for the Government of the United States for governmental purposes, without the payment to me of any royalty thereon.

I claim as my invention:

1. The method of measuring, with a loop antenna, vertical angles of incidence of energy waves having components of the magnetic flux thereof polarized vertically and horizontally in the plane or front of propagation of the wave, which comprises positioning a planar-axis of the antenna in azimuth in the vertical plane of incidence of the wave, swinging said axis in said vertical plane of incidence, and rotating said loop about said axis, until a position of pure null with minimum angle between the loop-plane and the said vertical plane is reached indicating that the plane of the loop coincides with the plane of the resultant of the components of magnetic flux of the wave, and determining the vertical angle of the said axis in said position with reference to a horizontal plane.

2. Means for measuring on a craft for variable attitude vertical angles of incidence of energy waves having components of the magnetic flux thereof polarized vertically and horizontally in the plane or front of propagation of the wave, comprising a loop antenna, said loop having a planar-axis positioned in azimuth in the vertical plane of incidence of the waves, said axis directed generally at the point of origin of the waves and generally coincident with the angle of incidence of waves from said point of origin and said loop being movably mounted so that said axis is tiltable in the said plane to follow changes of the said angle, and so that said loop is rotatable about said axis to position its plane at various angles to said vertical plane and generally coincident with the plane of the resultant magnetic flux of the energy waves when at the smallest angle to said vertical plane, means responsive to the reception of wave energy by said loop for indicating the occurrence of a reception null when said axis and loop-plane are in exact adjustment, whereby a null with a minimum angle between the loop plane and said vertical plane may be repeatedly obtained by minor tilting of said axis and oscillatory rotation of said loop about said null position, a device maintaining a horizontal plane of reference notwithstanding variation in attitude of the craft, and indicator means arranged to show the tilt of said axis with respect to said fixed plane of reference for indicating the absolute angle of said axis when said null is obtained.

3. The method of measuring, with a loop antenna, vertical angles of incidence of energy waves in the induction field of a transmitter, which comprises positioning a planar axis of the antenna in azimuth in the vertical plane of incidence of waves from the transmitter, manipulating the antenna, while maintaining said axis in said plane as well as may be done, until a pure null is obtained with a minimum angle between the loop-plane and said vertical plane, and determining the vertical angle of the said axis in said position with reference to a horizontal plane.

4. Means for measuring on a craft of variable attitude vertical angles of incidence of energy waves in the induction field of a transmitter, comprising a loop antenna, said loop having a planar-axis positioned in azimuth in the vertical plane of incidence of the waves in the induction field, said axis being in general alignment with the angle of incidence of said waves and said loop being movably mounted so that said axis is to follow changes in said angle, and so that the plane of said loop is movable into and out of general alignment with the lines of force of the incident waves enabling a null to be obtained with a minimum deviation angle between the plane of the loop and said vertical plane, means responsive to the reception of wave energy by said loop for indicating the occurrence of a null therein when said axis and loop-plane are aligned as aforesaid, whereby a null with said minimum deviation angle may be repeatedly obtained, an artificial horizon device presenting a fixed vertical angle scale notwithstanding variation in attitude of the craft, and an indicator means in cooperative relation to said scale arranged to indicate thereon the absolute angle of said axis when said null is obtained.

5. The method of measuring, with a loop antenna, vertical angles of incidence of energy waves having components of the flux thereof polarized vertically and horizontally in the plane of propagation of the wave, which comprises positioning a planar-axis of the antenna in the vertical plane of incidence of the wave and generally directed toward the source thereof, swinging said axis in said vertical plane, and rotating said loop about said axis, until a position of pure null with a minimum angle between said loop-plane and said vertical plane is reached, and determining the vertical angle of said axis for said last-named position.

6. Means for measuring vertical angles of incidence of energy waves having components of the flux thereof polarized vertically and horizontally in the plane or front of propagation of the wave, comprising a loop antenna, said loop having a planar-axis positioned in azimuth in the vertical plane of incidence of the waves, said axis directed generally at the point of origin of the waves and generally coincident with the angle of incidence of waves from said point of origin and said loop being movably mounted so that said axis is tiltable in the said plane to follow changes of the said angle, and so that the plane of said loop is turnable to and from a position generally coincident with the plane of the resultant flux of the energy waves enabling a null to be obtained with a minimum deviation angle between the plane of the loop and said vertical plane, means responsive to the reception of wave energy by said loop for indicating the occurrence of a reception null when said axis and loop-plane are in coincidence and have the minimum deviation angle as aforesaid, and means for determining the vertical angle of such coincidence of said axis.

7. The method of determining, with a loop-antenna, vertical angles of the induction field of a transmitter from an aircraft flying in said field, which comprises directing a planar axis of the loop normal to the plane of the lines of force of the induction field and rotating said loop about said axis to eliminate residual signal, and determining the angle of inclination of said axis with reference to horizontal when residual signal is reduced to a null with the plane of the loop at a minimum angle to the vertical plane of incidence of the field.

8. Means for determining vertical angles of the induction field of a transmitter from an aircraft flying in said field, comprising a loop antenna, a planar-axis of said antenna being directed generally normal to the plane tangent to the wave front of the lines of force of the induction field, and the plane of said antenna being directed generally parallel to the said lines of force, means for determining when said axis and plane are so directed, and means for determining the vertical angle of inclination of said axis with reference to horizontal.

9. In a system of measuring vertical angles of incidence of energy waves in the induction field of a transmitter, the steps of manipulating a loop-antenna to bring its plane into a pure null position as regards said induction field while maintaining a reference planar-axis of the antenna as nearly as may be in the vertical plane of azimuthal incidence of the waves and while maintaining a planar axis of the loop at right angles to the aforesaid planar axis of the smallest angle of deviation from the said vertical plane and pointed generally toward the source thereof.

10. In a system of measuring vertical angles of incidence of energy waves in the induction field of a transmitter, the sub-combination comprising a loop-antenna having a reference planar-axis maintained virtually in the vertical plane of azimuthal incidence of the energy waves and virtually normal to the plane or front of propagation of the waves and having its plane concurrently maintained virtually in a pure null position as regards said induction field, means for indicating the attaining of such null position, and means for moving said axis and loop-plane to follow changes in the direction of incidence for maintaining said null position in said induction field.

11. In a system of measuring vertical angles of incidence of energy waves in the induction field of a transmitter, the steps of positioning a loop-antenna so that a reference planar-axis of the antenna indicates the vertical angle of incidence of the field, and combining the indicated position of the said reference axis with a horizontal base line so that the angle of incidence may be read directly from a plane of reference parallel to the earth's surface.

12. In a system of measuring vertical angles of incidence of energy waves in the induction field of a transmitter from a craft of variable attitude, the sub-combination comprising a loop antenna having a reference planar-axis and so positioned that said axis indicates the vertical angle of incidence of the field, a device maintaining a horizontal plane of reference notwithstanding variation in attitude of the craft, and an indicator connected to move with said reference planar-axis and indicating the absolute angle of said axis with respect to said horizontal plane of reference.

13. Means for indicating the absolute angle of direction of a loop antenna angularly orientable with reference to an aircraft, said aircraft having a variable attitude, comprising a means of the artificial horizon type maintaining a plane of reference fixed relative to the earth and providing a scale of angular departure from such fixed plane, and an indicator mounted on said aircraft and connected with said loop antenna to be moved relative to said aircraft as said antenna is moved angularly relative thereto, said movable indicator being juxtaposed to said fixed plane of reference and scale to indicate thereon the sum of the angle of aircraft attitude and of the angular attitude of the antenna relative to the aircraft.

14. A method for determining the three dimensional angle of incidence of an electromagnetic wave-front having horizontally and vertically polarized components, employing a loop antenna having three axes, the first of said axes being normal to the plane of the loop and the second and third axes being planar axes of the loop normal to each other: which method comprises determining the azimuthal vertical plane of incidence of the wave-front; positioning said third axis in said vertical plane; tilting said third axis in said vertical plane and rotating the loop thereabout to position one of said first and second axes normal to the resultant magnetic flux lines as indicated by the obtaining on the loop of a determinate response—of the group consisting of minima and maxima—with the other of said first and second axes positioned relatively to said vertical plane in one of its determinate positions—of the group consisting of positions normal to and at a minimum angle to said plane; whereupon the tilt of the axis then lying normal to the wave-front in said vertical plane indicates the three dimensional angle of approach of the wave-front.

15. Means for determining the three-dimensional angle of approach of an electromagnetic wave-front having horizontally and vertically polarized components, comprising a loop antenna having three axes, the first of said axes being normal to the plane of the loop and the second and third of said axes being planar-axes of the loop normal to each other, means for determining the azimuthal vertical plane of approach of the wave-front, means for positioning said third axis in sai vetrical plane and for tilting said third axis in said plane and rotating the loop thereabout to position one of said first and second axes normal to the resultant magnetic flux-lines as indicated by the obtaining on the loop of a determinate response—of the group consisting of minima and maxima—with the other of said first and second axes positioned relative to said vertical plane in one of its determinate positions—of the group consisting of positions normal to and at a minimum angle to said plane; whereupon the tilt of the axis then lying normal to the wave front in said vertical plane indicates the three dimensional angle of approach of the wave front.

WILLIAM LEE CLEMMER.

CERTIFICATE OF CORRECTION.

Patent No. 2,269,437.                                            January 13, 1942.

WILLIAM LEE CLEMMER.

It is hereby certified that error appears in the printed specification of the above numbered patent requiring correction as follows: Page 2, second column, line 33, after "scale" insert --line--; and line 37, after "horizon" insert --line--; page 3, second column, line 55, for "TW¡" read --TW--; page 4, second column, line 23, for "swung to" read --swung in--; page 5, first column, line 29, claim 2, for "craft for" read --craft of--; and second column, line 9, claim 4, after "is" insert --tiltable--; and line 29, claim 5, after "plane" insert --or front--; page 6, first column, lines 26 and 27, claim 9, strike out "and pointed generally toward the source thereof" and insert the same after "waves" in line 22, same claim, and line 24, same claim 9, for "axis of" read --axis at--; and second column, line 51, claim 15, for "sai" read --said--; and line 61, same claim, for "plane" read -- plane-- --; and that the said Letters Patent should be read with this correction therein that the same may conform to the record of the case in the Patent Office.

Signed and sealed this 23rd day of June, A. D. 1942.

Henry Van Arsdale,
Acting Commissioner of Patents.

(Seal)